US010682727B2

(12) United States Patent
Gu et al.

(10) Patent No.: US 10,682,727 B2
(45) Date of Patent: Jun. 16, 2020

(54) METHODS OF MAKING PLASTIC-METAL JUNCTIONS VIA LASER

(71) Applicant: SABIC GLOBAL TECHNOLOGIES B.V., Bergen op Zoom (NL)

(72) Inventors: Hao Gu, Bergen op Zoom (NL); Hyemin Park, Gyeonggi-do (KR); Norio Ozawa, Tochigi (JP); Josephus Gerardus M. van Gisbergen, Bergen op Zoom (NL); Atsushi Ebisawa, Houston, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 52 days.

(21) Appl. No.: 16/062,193

(22) PCT Filed: Dec. 15, 2016

(86) PCT No.: PCT/IB2016/057692
§ 371 (c)(1),
(2) Date: Jun. 14, 2018

(87) PCT Pub. No.: WO2017/103861
PCT Pub. Date: Jun. 22, 2017

(65) Prior Publication Data
US 2019/0001441 A1    Jan. 3, 2019

Related U.S. Application Data

(60) Provisional application No. 62/268,986, filed on Dec. 17, 2015.

(51) Int. Cl.
*B32B 37/00* (2006.01)
*B29C 45/00* (2006.01)
(Continued)

(52) U.S. Cl.
CPC ........ *B23K 26/355* (2018.08); *B23K 26/0093* (2013.01); *B23K 26/324* (2013.01);
(Continued)

(58) Field of Classification Search
CPC .......................... B29C 66/0246; B32B 37/153
See application file for complete search history.

(56) References Cited

U.S. PATENT DOCUMENTS 3,575,762 A * 4/1971 Goehring et al. ...... B32B 15/08
156/244.23
9,279,436 B2 * 3/2016 Osada ...................... F16B 3/00
(Continued)

FOREIGN PATENT DOCUMENTS

CN       102712136 A    10/2012
DE    202014005241 U1     9/2014
(Continued)

OTHER PUBLICATIONS

English Abstract of WO2011086984(A1); Date of Publication: Jul. 21, 2011; 2 Pages.
(Continued)

*Primary Examiner* — Linda L Gray
(74) *Attorney, Agent, or Firm* — Cantor Colburn LLP

(57) ABSTRACT

Various embodiments relate to plastic-metal junctions and methods of making the same via laser-assisted joining. The present invention provides a method of forming a junction between a metal form and a solid plastic. The method can include laser treating a surface of a metal form to generate a feature (e.g., a plurality of at least one of pores and grooves) in the surface of the metal, wherein the laser has an angle of incidence with the surface of the metal of other than 0 degrees. The method can include contacting the metal surface including the feature with a flowable resin composition. The method can include curing the flowable resin (Continued)

composition to form the solid plastic, to provide the junction between the metal form and the solid plastic.

20 Claims, 6 Drawing Sheets

(51) Int. Cl.
| | |
|---|---|
| B23K 26/00 | (2014.01) |
| B23K 26/352 | (2014.01) |
| B23K 26/324 | (2014.01) |
| B29C 45/14 | (2006.01) |
| B32B 37/15 | (2006.01) |
| B29C 65/00 | (2006.01) |
| B29C 65/82 | (2006.01) |
| B29C 65/18 | (2006.01) |
| B32B 37/18 | (2006.01) |
| B29K 105/00 | (2006.01) |
| B32B 37/20 | (2006.01) |
| B29K 705/00 | (2006.01) |

(52) U.S. Cl.
CPC ........ *B29C 45/14311* (2013.01); *B29C 65/18* (2013.01); *B29C 65/8215* (2013.01); *B29C 66/0246* (2013.01); *B29C 66/1122* (2013.01); *B29C 66/30325* (2013.01); *B29C 66/30326* (2013.01); *B29C 66/45* (2013.01); *B29C 66/742* (2013.01); *B29C 66/83221* (2013.01); *B29C 66/83413* (2013.01); *B29C 66/919* (2013.01); *B29C 66/929* (2013.01); *B32B 37/153* (2013.01); *B32B 37/182* (2013.01); *B29C 65/8253* (2013.01); *B29C 66/71* (2013.01); *B29C 66/7422* (2013.01); *B29C 66/7428* (2013.01); *B29C 66/74281* (2013.01); *B29C 66/74283* (2013.01); *B29C 2791/009* (2013.01); *B29K 2105/0079* (2013.01); *B29K 2705/00* (2013.01); *B32B 37/203* (2013.01)

(56) References Cited

U.S. PATENT DOCUMENTS

| | | | |
|---|---|---|---|
| 2005/0133306 A1* | 6/2005 | Lochocki, Jr. | F16H 57/0452 184/106 |
| 2013/0192751 A1 | 8/2013 | Arai et al. | |
| 2016/0052202 A1* | 2/2016 | Nishikawa | B29C 45/14 403/265 |
| 2016/0167353 A1* | 6/2016 | Fan | B32B 15/08 216/39 |

FOREIGN PATENT DOCUMENTS

| | | |
|---|---|---|
| JP | 2009226643 A | 8/2009 |
| JP | 2012187861 A | 10/2012 |
| WO | 2011086984 A1 | 7/2011 |

OTHER PUBLICATIONS

International Search Report for International Application No. PCT/IB2016/057692; International Filing Date: Dec. 15, 2016; dated Feb. 23, 2017; 5 Pages.

Machine Translation of JP2012187861(A1); Date of Publication: Oct. 4, 2012; 6 Pages.

Written Opinion of the International Searching Authority for International Application No. PCT/IB2016/057692; International Filing Date: Dec. 15, 2016; dated Feb. 23, 2017; 5 Pages.

* cited by examiner

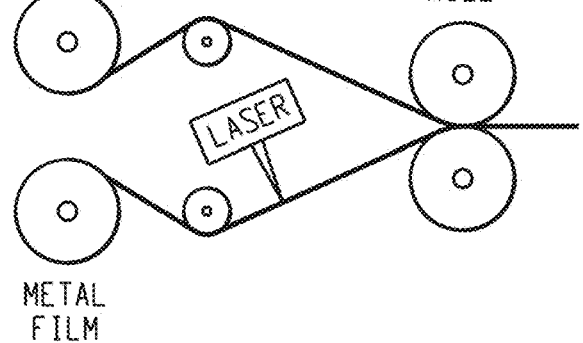
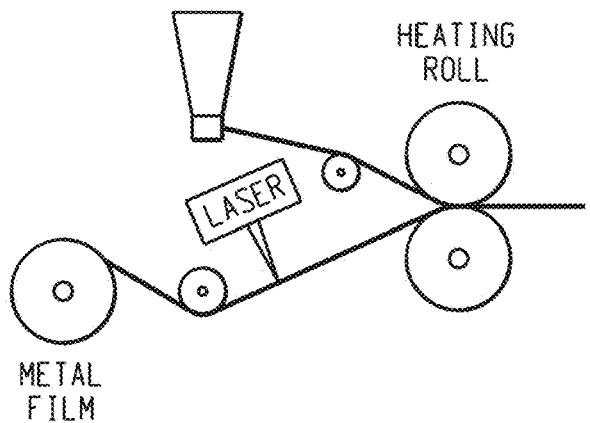
Fig. 1A
Fig. 1B
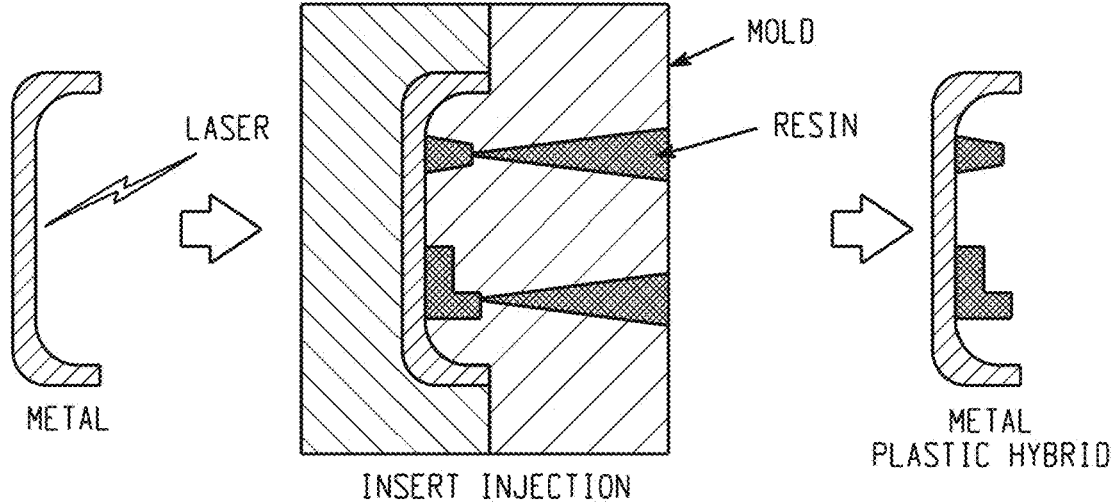
Fig. 2
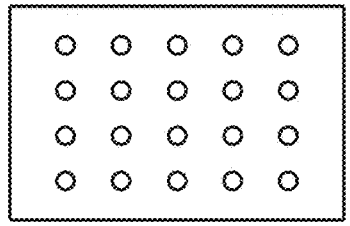
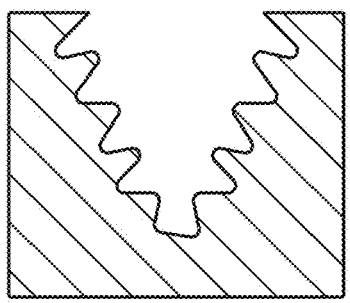
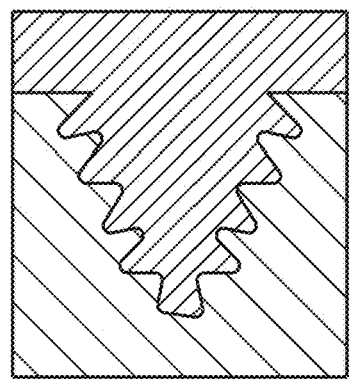
Fig. 3A
Fig. 3B
Fig. 3C

US 10,682,727 B2

METHODS OF MAKING PLASTIC-METAL JUNCTIONS VIA LASER

CROSS REFERENCE TO RELATED APPLICATIONS

This application is a 371 of International Application No. PCT/IB2016/057692, filed Dec. 15, 2016, which claims priority to U.S. Ser. No. 62/268,986 filed Dec. 17, 2015, which are incorporated herein by reference in their entirety.

BACKGROUND

The formation of junctions between metal and plastic is useful for a variety of applications. Currently, the most common way to form a junction between metal and plastic is using glue. For instance, for an extrusion lamination application, the glue layer is placed between the metal and the plastic. However, glue presents cost, toxicity, weight, and environmental concerns, Sometimes, a secondary operation is needed to cut out excess un-needed dried glue. In addition, the application and curing of glue consumes time. For in-mold injection molding, chemical etching of metal surface is sometimes used. However, some types of plastic resins are not compatible with chemical etching methods, and chemical etching can generate a limited variety of surface features on the metal. Also, chemical etching cannot easily provide localized or patterned treatment of the metal surface.

During formation of junctions between plastic and metal, the metal part is first cut by machining, with subsequent treatment of the metal surface in a separate step to prepare it for joining to the plastic.

SUMMARY

The present subject matter provides a method of forming a junction between a metal form and a solid plastic. The method includes laser treating a surface of a metal form to generate a plurality of pores, grooves, or a combination thereof, in the surface of the metal, wherein the laser has an angle of incidence with the surface of the metal of other than 0 degrees. The method includes contacting the metal surface including the feature with a flowable resin composition. The method also includes curing a flowable resin composition to form the solid plastic, to provide the junction between the metal form and the solid plastic.

The present subject matter provides a method of forming a junction between a metal form and a solid plastic. The method includes machining a metal form. The method includes laser treating a surface of a metal form to generate a plurality of pores, grooves, or a combination thereof, in the surface of the metal, wherein the machining and laser etching are performed at least partially simultaneously. The method includes contacting the metal surface including the feature with a flowable resin composition. The method also includes curing A flowable resin composition to form the solid plastic, to provide the junction between the metal form and the solid plastic.

The method of forming a plastic-metal junction including using a laser having an angle of incidence to the metal surface of other than 0 degrees has certain advantages over other methods of forming plastic-metal junctions, at least some of which are unexpected. For example, in various embodiments, the method can generate a stronger plastic-metal junction than junctions formed using glue or chemical etch alone. The method can generate a stronger plastic-metal junction than junctions formed using laser treatment of a metal surface using a laser having a 0 degree angle of incidence to the metal surface.

The method can generate a lighter-weight plastic-metal junction than plastic-metal junctions formed using glue. The method can generate a lower cost plastic-metal junction than plastic-metal junctions formed using glue or chemical etching. The method can generate a plastic-metal junction using less toxic materials than used to form plastic-metal junctions with glue or chemical etching. The method can generate a plastic-metal junction with fewer toxicity and environmental concerns than methods used for forming plastic-metal junctions with glue or chemical etching. For example, in various embodiments, the method can generate a plastic-metal junction without use of the toxic and environmentally harmful chemical treatments and rinsing involved with methods such as chemical etching.

The laser treatment can be performed quickly, and the laser-treated surface can be ready for joining to a plastic immediately after the laser treatment, allowing the method of forming plastic-metal junctions to be performed more quickly than methods including chemical etching or glue. The laser treatment step can be easily incorporated with other machining steps, such as by incorporating with machines such as a mill, lathe, or other machines. The laser treatment can be integrated with various steps of the process, such as by incorporating with an injection machine, a hot press machine, or other processing machines. The laser treatment can cause heating of the metal form, which can avoid or decrease the need for a separate heating step prior to forming the junction between the metal and the plastic.

The method of forming plastic-metal junctions can be compatible with a greater variety of plastics and metals than methods used for forming plastic-metal junctions with glue or chemical etching alone. The method of forming plastic-metal junctions can provide a greater variety of surface features on the metal than methods using chemical etching alone. The greater variety of surface features available via the laser treatment can provide greater options for customization, such as to fit the needs to end-users. The method of forming plastic-metal junctions can provide more localized or more easily patterned surface treatments than methods using chemical etching or glue alone.

At least partially simultaneously performing laser treatment of the metal surface and machining of the metal surface can require less time, lower cost, or a combination thereof, to form a metal surface that is ready for joining to plastic than other techniques with separate machining and surface treatment steps.

BRIEF DESCRIPTION OF THE FIGURES

The drawings illustrate generally, by way of example, but not by way of limitation, various embodiments discussed in the present document.

FIG. 1A illustrates a lamination process, in accordance with various embodiments.

FIG. 1B illustrates an extrusion coating process, in accordance with various embodiments.

FIG. 2 illustrates an insert injecting molding process, in accordance with various embodiments.

FIG. 3A illustrates an example of a pattern of pores, in accordance with various embodiments.

FIG. 3B illustrates an example of a side profile of a pore or groove, in accordance with various embodiments.

FIG. 3C illustrates an example of a side profile of a pore or groove having a flowable resin composition therein, wherein the flowable resin composition substantially fills the pore or groove, in accordance with various embodiments.

DETAILED DESCRIPTION

Figure 4A:
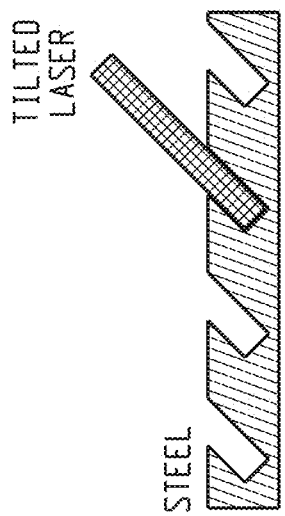
FIGS. 4A-C illustrate laser treating of a metal surface using a laser having varying incident angles with respect to the metal surface that are other than 0 degrees, and the pores or grooves formed therefrom, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Disclosed herein is a method of forming a junction between a metal form and a solid plastic. The method can include laser treating a surface of a metal form to generate a plurality of pores, grooves, or a combination thereof, in the surface of the metal, wherein the laser has an angle of incidence with the surface of the metal of other than 0 degrees. The method can include contacting the metal surface including the feature with a flowable resin composition. The method can also include curing the flowable resin composition to form the solid plastic, to provide the junction between the metal form and the solid plastic.

The method can include machining the metal form. The machining can be any suitable machining, wherein the machining removes at least some metal from the metal form. The machining can be performed with a multi-axis machining center. The machining can be performed with a lathe or milling machine. The machining of the metal form and the laser treating of the surface of the metal form can be performed at least partially simultaneously, or fully simultaneously. The machining of the metal form and the laser treating of the surface of the metal form, if performed simultaneously, can be performed on different parts of the metal form (e.g., one part of the metal form can be machined, while another optionally already-machined portion of the metal form can be laser treated).

Prior to or during the contacting the metal surface including the feature with a flowable resin composition, the method can include heating the metal form to a temperature at or above a glass transition temperature, of a flowable resin composition. The method can include penetrating the pores or grooves of the metal surface with the flowable resin composition before the curing, such that the pores or grooves are substantially filled with the flowable resin composition before the curing. Heating the metal surface to a temperature above the glass transition temperature can allow the flowable resin composition to flow into the pores or grooves and substantially completely fill the pores or grooves before curing.

The laser treatment can be performed directly on the metal surface of the metal form, such that the pores or grooves are formed directly in the metal of the metal form, and such that contacting the metal surface including the feature with the flowable resin composition includes directly contacting the metal and the flowable resin composition. The metal form can include an adhesion film or coating on the surface thereof, wherein the laser treating performed on the metal form is performed at least partially on the adhesion film or coating, such that the pores or grooves are formed at least partially in the adhesion film or coating rather than directly in the metal itself, and such that contacting the metal surface including the feature with the flowable resin composition includes contacting the adhesion film or coating on the metal form and the flowable resin composition. The pores or grooves can be formed in an adhesion film or coating and directly in the metal, such as with pores or grooves that completely penetrate the adhesion film or coating and also penetrate part of the metal form, or such as with an adhesion film or coating that only partially covers the laser treated surface of the metal form. The adhesion film or coating on the metal form, if present, can be any suitable adhesion film or coating. Some embodiments can include adding the adhesion film or coating to the metal form after machining the metal form.

The contacting can include penetrating the surface structures with the flowable resin composition before the curing, such that the flowable resin composition substantially fills the majority of pores or grooves. For example, the flowable resin composition can substantially fill about 50 vol % to about 100 vol % of the pores or grooves, such as the average vol of all flowable resin composition-filled pores or grooves, or about 90 to 100 vol %, or about 50 vol % or less, or about 55 vol %, 60, 65, 70, 75, 80, 82, 84, 86, 88, 90, 92, 94, 95, 96, 97, 98, 99, 99.9, or about 99.99 vol % or more.

Contacting the metal surface including the feature with the flowable resin composition can be performed in any suitable way, such as injection molding (e.g., injecting a flowable resin into a mold, wherein the mold contains or is the metal form), extrusion coating (e.g., coating of a web of extruded flowable resin onto the metal form), extrusion lamination (e.g., laminating a web of extruded flowable resin onto the metal form), thermal lamination (e.g., material is heated to form flowable resin, which is then laminated onto the metal form), hot pressing (e.g., solid material and metal form are pressed together with heating until solid material melts into the flowable, resin), hot forming (e.g., solid material is heated to form flowable resin, which is then contacted to metal form), heat conduction joining (e.g., laser is used to heat a solid material to form flowable resin, which is then contacted to metal form), or a combination thereof. The surface of the metal form can be heated prior to or during the contacting. The laser treatment can provide some or all of the heating prior to contacting.

The contacting of the metal surface including the feature with the flowable resin composition can include a lamination process wherein a heater or heating roll is used to melt a film to form the flowable resin composition which contacts the metal surface. FIG. 1A illustrates an example of an embodiment of a lamination process.

The contacting of the metal surface including the feature with the flowable resin composition can include extrusion coating. Extrusion coating can include the coating of a molten web of the flowable resin composition onto the metal surface including the feature, wherein the flowable resin composition is extruded from slot die. Extrusion lamination can be similar to extrusion coating but can include another sheet of material, such that the flowable resin composition bonds the metal form to the other sheet of material. FIG. 1B illustrates an example of an extrusion coating process.

The contacting of the metal surface including the feature with the flowable resin composition can include injection molding, such that the flowable resin composition is heated and under pressure when contacted with the metal form. The injection molding process can be any suitable injecting molding process. The injection molding can include insert injection molding, wherein a) the insert can be the metal form that is laser treated, b) wherein the insert is free of laser treatment, or c) wherein the insert and the metal form are distinct and each is subjected to laser treatment to form a feature (e.g., comprising a plurality of pores and/or grooves). An example of an insert molding process, wherein the insert is the metal form, is shown in FIG. 2.

The bonding strength (e.g., the tensile shear at break) between the metal form and the solid plastic can be any suitable bonding strength, such as about 1 MPa to about 100 MPa, about 6 MPa to about 30 MPa, or about 1 MPa or less, or about 2, 4, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60, 65, 70, 75, 80, 85, 90, 95, or about 100 MPa or more.

The metal form can include any suitable metal. The metal form can include one elemental metal or a combination of more than one elemental metal. The metal form can include aluminum, steel (e.g., stainless steel), iron, copper, titanium, magnesium, or any combination thereof (e.g., an alloy or a heterogeneous mixture). The metal form can include any other suitable materials, in addition to the one or more metals. The one or more elemental metals can form any suitable proportion of the metal form, such as about 50 wt % to about 100 wt %, or about 50 wt % or less, or about 55 wt %, 60, 65, 70, 75, 80, 85, 90, 95, 96, 97, 98, 99, 99.9, or about 100 wt %.

The flowable resin composition can be any suitable flowable resin composition, such that the method can be carried out as described herein. The flowable resin composition can be a thermoplastic, a thermoset, or a combination thereof. Curing the flowable resin composition can include cooling the flowable resin composition such that it solidifies (e.g., in the case of a thermoplastic flowable resin composition), heating the flowable resin composition such that it solidified (e.g., in the case of a thermoset flowable resin composition), or a combination thereof.

Any one of more of the polymers listed in this section can form any suitable proportion of the flowable resin composition, such as about 0 wt % to about 100 wt %, about 0.01 wt % to about 100 wt %, or 0 wt %, or about 0.01 wt % or less, or about 0.1 wt %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more, or about 100 wt %.

The flowable resin composition can include at least one of an acrylonitrile butadiene styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an ionomer, an acrylic/PVC alloy, a liquid crystal polymer (LCP), a polyacetal polymer (POM or acetal), a polyacrylate polymer, a polymethylmethacrylate polymer (PMMA), a polyacrylonitrile polymer (PAN or acrylonitrile), a polyamide polymer (PA, such as nylon), a polyamide-imide polymer (PAI), a polyaryletherketone polymer (PAEK), a polybutadiene polymer (PBD), a polybutylene polymer (PB), a polybutylene terephthalate polymer (PBT), a polycaprolactone polymer (PCL), a polychlorotrifluoroethylene polymer (PCTFE), a polytetrafluoroethylene polymer (PTFE), a polyethylene terephthalate polymer (PET), a polycyclohexylene dimethylene terephthalate polymer (PCT), a polycarbonate polymer (PC), a polyhydroxyalkanoate polymer (PHA), a polyketone polymer (PK), a polyester polymer, a polyethylene polymer (PE), a polyetheretherketone polymer (PEEK), a polyetherketoneketone polymer (PEKK), a polyetherketone polymer (PEK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), a polyamideimide polymer (PAI), a polyarylate polymer, a polyoxymethylene polymer (POM), and a styrene-acrylonitrile polymer (SAN) The flowable resin composition can include polycarbonate (PC), acrylonitrile butadiene styrene (ABS), polybutylene terephthalate (PBT), polyethylene terephthalate (PET), polyetherimide (PEI), poly(p-phenylene oxide) (PPO), polyamide(PA), polyphenylene sulfide (PPS), polyethylene (PE) (e.g., ultra high molecular weight polyethylene (UHMWPE), ultra low molecular weight polyethylene (ULMWPE), high molecular weight polyethylene (HMWPE), high density polyethylene (HDPE), high density cross-linked polyethylene (HDXLPE), cross-linked polyethylene (PEX or XLPE), medium density polyethylene (HDPE), low density polyethylene (LDPE), linear low density polyethylene (LLDPE) and very low density polyethylene (VLDPE)), polypropylene (PP), or a combination thereof.

The Flowable resin composition can includes a polymer that is amorphous at standard temperature and pressure, a polymer that is crystalline at standard temperature and pressure, or a combination thereof. As used herein, the term "amorphous" as applied to a plastic or polymer refers to a plastic or polymer that has less than about 10 vol % crystalline regions, such as about 9 vol %. 8, 7, 6, 5, 4, 3, 2, 1, or about 0 vol % (e.g., an amorphous polymer need not be 100 vol % amorphous). As used herein, the term "crystalline" as applied to a plastic or polymer refers to a plastic or polymer that has more than about 10 vol % crystalline regions, such as about 10 vol % to about 80 vol %, or about 10 vol %, 15, 20, 25, 30, 35, 40, 45, 50, 55, 60, 65, 70, 75, 80, 85, 90, 95, or 100 vol % crystalline regions (e.g., a crystalline polymer need not be 100 vol % crystalline, and can be a semi-crystalline polymer).

The flowable resin composition can include one or more polymers that are amorphous (e.g., that are each less than about 10 vol % crystalline when pure) at standard temperature and pressure and that are chosen from polycarbonate polymer (PC), a polyetherimide polymer (PEI), a polyphenylene oxide polymer (PPO), a polyamide (PA), a polymethylmethacrylate polymer (PMMA), a polyvinylchloride polymer (PVC), an acrylonitrile butadiene styrene polymer (ABS), a polystyrene polymer (PS), a polyethersulfone polymer (PES), a polyamideimide polymer (PAI), a polyarylate polymer, and a polysulfone (PSU). The one or more polymers that are amorphous at standard temperature and pressure can be chosen from a polycarbonate polymer (PC), a polyetherimide polymer (PEI), and a polyphenylene, oxide polymer (PPO). About 0.01 wt % to about 100 wt % of the flowable resin can be one or more amorphous polymers such that together the polymers have less than about 10 vol % crystallinity at standard temperature and pressure), about 40 wt % to about 100 wt %, about 50 wt % to about 100 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

The flowable resin composition can include one or more polymers that are crystalline (e.g., that are each more than about 10 vol % crystalline when pure, or that are about 10 vol % to about 80 vol % crystalline when pure) at standard temperature and pressure and that is chosen from a polybutylene terephthalate polymer (PBT), a polyphenylene sulfide polymer (PPS), a polyamide polymer (PA or nylon, such as nylon 6.6 or nylon 11), a polytetrafluoroethylene polymer (PTFE), a linear polyethylene polymer (PE), a polypropylene polymer (PP), a polyetherketone polymer (PEK), a polyetheretherketone polymer (PEEK), a polyetherketoneketone polymer (PEKK), a polyphthalamide polymer (PPA), and a polyoxymethylene polymer (POM). The flowable resin composition can include one or more crystalline polymers that are chosen from a polybutylene terephthalate polymer (PBT), a polyphenylene sulfide polymer (PPS), a polyamide polymer (PA or nylon), and a polyetheretherketone polymer (PEEK). About 0.01 wt % to about 100 wt % of the flowable resin can be one or more crystalline polymers (e.g., such that together the polymers have more than about 10 vol % crystallinity at standard temperature and pressure, such as about 10 vol % to about 80 vol %), about 40 wt % to about 100 wt %, about 50 wt % to about 100 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

The flowable resin composition can include one or more polyolefins, such as a polyethylene, a polyacrylate, a polyacrylamide, a polyvinylchloride, a polystyrene, or another polyolefin. The polyolefin can be any suitable polyolefin. The one or more polyolefins can form any suitable proportion of the flowable resin composition, such as about 0.001 wt % to about 50 wt % of the flowable resin composition, or about 0.01 wt % to about 30 wt %, or about 0.001 wt % or less, or about 0.01 wt %, 0.1, 1, 2, 3, 4, 5, 10, 15, 20, 25, 30, 35, 40, 45 wt %, or about 50 wt % or more.

The flowable resin composition can include one or more polyesters, such as aromatic polyesters, poly(alkylene esters) including poly(alkylene arylates) (e.g., poly(alkylene terephthalates)), and poly(cycloalkylene diesters) (e.g., poly(cycloghexanedimethylene terephthalate) (PCT), or poly(1, 4-cyclohexane-dimethanol-1,4-cyclohexanedicarboxylate) (PCCD)), and resourcinol-based aryl polyesters. The polyester can be poly(isophthalate-terephthalate-resorcinol)esters, poly(isophthalate-terephthalate-bisphenol A)esters, poly[(isophthalate-terephthalate-resorcinol)ester-co-(isophthalate-terephthalate-bisphenol A)]ester, or a combination including at least one of these. Examples of poly(alkylene terephthalates) include polyethylene terephthalate) (PET), poly(1,4-butylene terephthalate) (PBT), and poly(propylene terephthalate) (PPT). Also useful are poly(alkylene naphthoates), such as polyethylene naphthanoate) (PEN), and poly(butylene naphthanoate) (PBN). Copolymers including alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer includes greater than or equal to 50 mol % of polyethylene terephthalate), and abbreviated as PCTG where the polymer includes greater than 50 mol % of poly(1,4-cyclohexanedimethylene terephthalate). The one or more polyesters can form any suitable proportion of the flowable resin composition, such as about 0.001 wt % to about 50 wt % of the flowable resin composition, or about 0.01 wt % to about 30 wt %, or about 0.001 wt % or less, or about 0.01 wt %, 0.1, 1, 2, 3, 4, 5, 10, 15, 20, 25, 30, 35, 40, 45 wt %, or about 50 wt % or more.

The flowable resin composition can include a filler, such as one filler or multiple fillers. The filler can be any suitable type of filler. The filler can be homogeneously distributed in the flowable resin composition. The one or more fillers can form about 0.001 wt % to about 50 wt % of the flowable resin composition, or about 0.01 wt % to about 30 wt %, or about 0.001 wt % or less, or about 0.01 wt %, 0.1, 1, 2, 3, 4, 5, 10, 15, 20, 25, 30, 35, 40, 45 wt %, or about 50 wt % or more. The filler can be fibrous or particulate. The filler can be aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dehydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (atmospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers; sulfides such as molybdenum sulfide, zinc sulfide, or the like; barium compounds such as barium titanate, barium ferrite, barium sulfate, heavy spar, or the like; metals and metal oxides such as particulate or fibrous aluminum, bronze, zinc, copper and nickel, or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as kenaf, cellulose, cotton, sisal, jute, flax, starch, corn flour, lignin, ramie, rattan, agave, bamboo, hemp, ground nut shells, corn, coconut (coir), rice grain husks or the like; organic fillers such as polytetrafluoroethylene, reinforcing organic fibrous fillers formed from organic polymers capable of forming fibers such as poly (ether ketone), polyimide, polybenzoxazole, poly(phenylene sulfide), polyesters, polyethylene, aromatic polyamides, aromatic polyimides, polyetherimides, polytetrafluoroethylene, acrylic resins, polyvinyl alcohol) or the like; as well as additional fillers such as mica, clay, feldspar, flue dust, finite, quartz, quartzite, perlite, Tripoli, diatomaceous earth, carbon black, or the like, or combinations including at least one of the foregoing fillers. The filler can be talc, glass fiber, kenaf fiber, or combinations thereof. The filler can be coated with a layer of metallic material to facilitate conductivity, or surface treated with silanes, siloxanes, or a combination of silanes and siloxanes to improved adhesion and dispersion with the flowable resin composition. The filler can be selected from glass fibers, carbon fibers, a mineral fillers, or combinations thereof. The filler can be is selected from mica, talc, clay, wollastonite, zinc sulfide, zinc oxide, carbon fibers, glass fibers ceramic-coated graphite, titanium dioxide, or combinations thereof. The filler can be glass fiber.

The method can include laser treating a surface of a metal form generate a feature comprising plurality of at least one of pores and grooves, in the surface of the metal. The laser can be a multi-axis laser, wherein the laser can move on more than one axis during the laser treatment. The laser treating can include treating with one laser or with more than one laser (e.g., 1, 2, 3, or more lasers), wherein the more than one lasers can be used at least partially simultaneously or one at a time. The laser used to perform the laser treating can be integrated with (e.g., part of) a machine used to perform the contacting between a surface of a metal form and a flowable resin, or curing of the flowable resin. The laser used to perform the laser treating can be integrated with a machine used to perform machining steps on the metal form.

The laser treatment can be performed with any suitable laser, such as a pulsed laser, a continuous laser, a gas laser, a chemical laser, a dye laser, a metal-vapor laser, a solid-state laser, a semiconductor laser, a free electron laser, a gas dynamic laser, a Raman laser, a nuclear pumped laser, or a combination thereof. The one or more lasers can include any suitable laser, such as a gas laser, a chemical laser, a dye laser, a metal-vapor laser, a solid-state laser, a semiconductor laser, a free electron laser, a gas dynamic laser, a Raman laser, a nuclear pumped laser, or a combination thereof. The gas laser can be at least one of a helium-neon laser, argon laser, krypton laser, xenon ion laser, nitrogen laser, carbon dioxide laser, carbon monoxide laser, and an excimer laser. The chemical laser can be at least one of a hydrogen fluoride laser, deuterium fluoride laser, chemical oxygen-iodine laser (COIL), and an all gas-phase iodine laser (AGIL). The metal-vapor laser can be a laser using metal vapors such as at least one of helium-cadmium metal vapor, helium-mercury, helium-selenium, helium-silver, strontium vapor, neon-copper, copper, and gold metal vapor. The solid-state laser can be at least one of a ruby laser, a neodymium-doped yttrium aluminum garnet (Nd:$Y_3Al_5O_{12}$, or Nd:YAG) laser, a neodymium- and -chromium-doped yttrium aluminum garnet (NdCr:$Y_3Al_5O_{12}$) laser, an erbium-doped yttrium aluminum garnet (Er:$Y_3Al_5O_{12}$) laser, a neodymium-doped yttrium lithium fluoride (Nd:$LiYF_4$) laser, a neodymium-doped yttrium orthovanadate (Nd:$YVO_4$) laser, a neodymium-doped yttrium calcium oxoborate (Nd:$YCa_4O(BO_3)_3$) laser, a neodymium glass (Nd:glass) laser, a titanium sapphire (Ti:sapphire) laser, a thulium yttrium aluminum garnet (Tm:$Y_3Al_5O_{12}$) laser, a ytterbium yttrium aluminum garnet (Yb:$Y_3Al_5O_{12}$) laser, a ytterbium-doped glass laser, a holmium-doped yttrium aluminum garnet (Ho:$Y_3Al_5O_{12}$) laser, a chromium-doped zinc selenide (Cr:ZnSe) laser, a cerium-doped lithium strontium (or calcium) aluminum fluoride (Ce:LiSAF, Ce:LiCAF) laser, a chromium doped chrysoberyl (alexandrite) laser, and an erbium-doped or erbium-ytterbium-codoped glass laser. The semiconductor laser can be at least one of a semiconductor laser diode, GaN laser, InGaN laser, AlGaInP or AlGaAs laser, InGaAsP laser, lead salt laser, quantum cascade laser, and a hybrid silicon laser. The laser can be a Nd:YAG laser (e.g., with an approximately 1064 nm wavelength), a UV laser (e.g., a Nd:YAG or Nd:$YVO_4$ laser with an approximately 263 nm wavelength), or a combination thereof.

The laser treating can include treating with a laser that is a pulsed laser. The pulse duration can be about 1 fs (femtosecond) to about 1 s, 1 fs to about 100 ns (nanosecond), or about 1 fs or less, or less than, equal to, or greater than about 2 fs, 4, 6, 8, 10, 15, 20, 30, 40, 50, 75, 100, 150, 200, 250, 500, 750 fs, 1 ps (picosecond), 2, 4, 6, 8, 10, 15, 20, 30, 40, 50, 75, 100, 150, 200, 250, 500, 750 ps, 1 ns, 2, 4, 6, 8, 10, 15, 20, 30, 40, 50, 75, 100, 150, 200, 250, 500, 750 ns, 1 μs (microsecond). 2, 4, 6, 8, 10, 15, 20, 30, 40, 50, 75, 100, 150, 200, 250, 500, 750 ns, 1 ms (millisecond), 2, 4, 6, 8, 10, 15, 20, 30, 40, 50, 75, 100, 150, 200, 250, 500, 750 ms, or about 1 s or more.

The laser can have an angle of incidence with the surface of the metal (i.e., an angle formed between a line perpendicular to the surface of the metal at the location of laser treatment and the laser beam) of other than 0 degrees. The laser can have an angle of incidence with the surface of the metal of 0 degrees. The laser can have an angle of incidence with the surface of the metal of greater than 0 degrees to less than 90 degrees, greater than 0 degrees to about 60 degrees, or about 0 degrees, or less than, equal to, or greater than about 0.1, 0.2, 0.5, 1, 2, 3, 4, 5, 6, 8, 10, 12, 14, 16, 18, 20, 25, 30, 35, 40, 45, 50, 55, 60, 65, 70, 75, 80, 81, 82, 83, 84, 85, 86, 87, 88, 89, 89.1, 89.5, or about 89.9 or more. For example, 5 to 80 degrees, or 5 to 45 degrees, or 5 to 35 degrees, or 1 to 10 degrees. In addition to the laser treating of the surface of the metal form with an angle of incidence to the metal surface of other than 0 degrees, the method can further include laser treating of the surface of the metal form with an angle of incidence to the metal surface of about 0 degrees using the same or a different laser.

The pores can have any suitable diameter, wherein for a non-circular pore the diameter can be considered the largest dimension of the opening of the pore that is approximately parallel to the surface of the metal. The grooves can have any suitable width. For example, the pores can have a diameter, and the grooves can have a width, of about 1 nm to about 1 mm, about 1 nm to about 1,000 nm, about 1 micrometer to about 1,000 micrometers, or less than, equal to, or greater than about 1 nm, 2, 3, 4, 5, 10, 15, 20, 25, 50, 75, 100, 150, 200, 250, 500, 750 nm, 1 micrometer, 2, 3, 4, 5, 15, 20, 25, 50, 75, 100, 150, 200, 250, 500, 750 micrometers, or about 1 mm or more. The pores or grooves can have any suitable depth, such as about 1 nm to about 1 mm, about 1 nm to about 1000 nm, about 1 micrometer to about 1000 micrometers, or less than, equal to, or greater than about 1 nm, 2, 3, 4, 5, 10, 15, 20, 25, 50, 75, 100, 150, 200, 250, 500, 750 nm, 1 micrometer, 2, 3, 4, 5, 15, 20, 25, 50, 75, 100, 150, 200, 250, 500, 750 micrometers, or about 1 mm. The density of the pores or grooves can be any suitable density, such as about 1 pore or groove to about 1,000,000,000,000 per square mm, or about 10 pores or grooves to about 1,000,000,000 pores or grooves per square mm, or about 100 pores or grooves to about 1,000,000 pores or grooves per square trim, or about 1 pore or groove, or less than, equal to, or greater than about 2, 3, 4, 5, 10, 20, 50, 100, 150, 200, 250, 500, 750, 1,000, 2,000, 5,000, 10,000, 20,000, 50,000, 100,000, 500,000, 1,000,000, 2,000,000, 5,000,000, 10,000, 000, 100,000,000, 1,000,000,000, or about 500,000,000,000 or more pores or grooves per square mm. The grooves can have any suitable length, such as about 1 nm to about 1 m, or about 1 nm to about 100 mm, or less than, equal to, or greater than about 1 nm, 2, 3, 4, 5, 10, 15, 20, 30, 40, 50, 75, 100, 150, 200, 250, 500, 750, 1 micrometer, 2, 3, 4, 5, 10, 15, 20, 30, 40, 50, 75, 100, 150, 200, 250, 500, 750 micrometers, 1 mm, 2, 3, 4, 5, 10, 15, 20, 30, 40, 50, 75, 100, 150, 200, 250, 500, 750 mm, or about 1 meter.

Figure 4B:
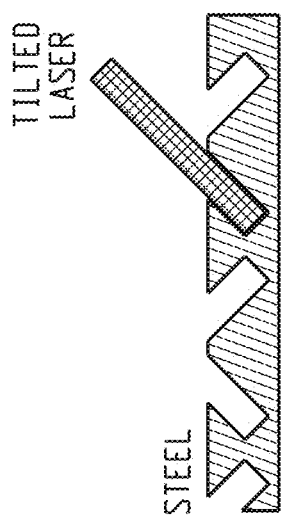
Figure 4C:
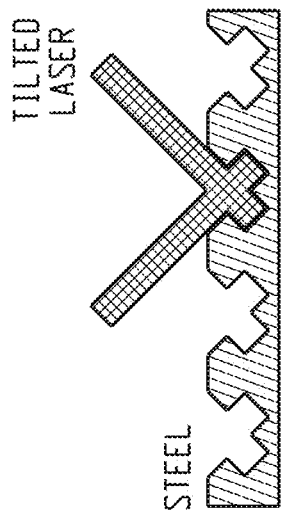

At least part of the sides of the pores or grooves can have an angle with respect to a line perpendicular to the surface of the metal surface at the location of the pore or groove of other than 0 degrees, such as greater than 0 degrees and less than about 180 degrees, or less than, equal to, or greater than about 0.1, 0.2, 0.5, 1, 2, 3, 4, 5, 6, 8, 10, 12, 14, 16, 18, 20, 25, 30, 35, 40, 45, 50, 55, 60, 65, 70, 75, 80, 85, 90, 95, 100, 105, 110, 115, 120, 30, 135, 140, 145, 150, 155, 160, 165, 170, 172, 174, 176, 178, or about 179 degrees or more. FIG. 3A illustrates an example of a pattern of pores. FIG. 3B illustrates an example of a side profile of a pore or groove. FIG. 3C illustrates an example of side profile of a pore or groove having a flowable resin composition therein, wherein the flowable resin composition substantially fills the pore or groove. FIGS. 4A-C illustrate laser treating of a metal surface using a laser having varying incident angle with respect to the metal surface, and the pores or Grooves formed therefrom.

Figure 5A:
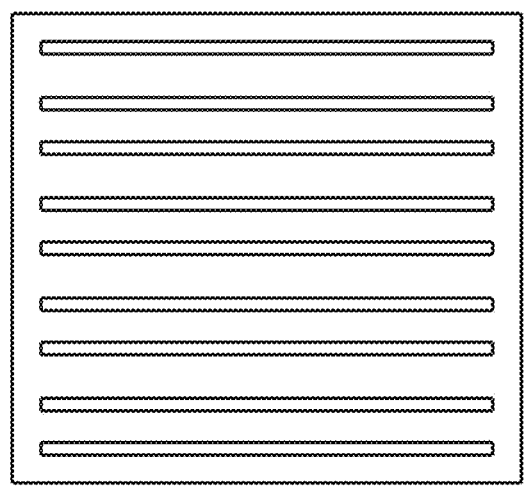
FIG. 5A illustrates a laser treatment with a line pattern of grooves, in accordance with various embodiments.
Figure 5B:
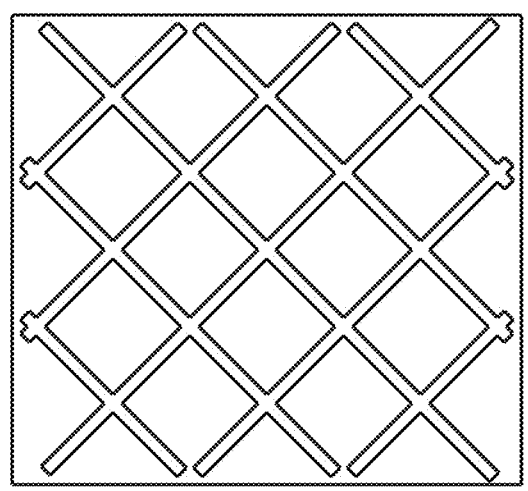
FIG. 5B illustrates a laser treatment with a crossed line pattern of grooves, in accordance with various embodiments.
Figure 5C:
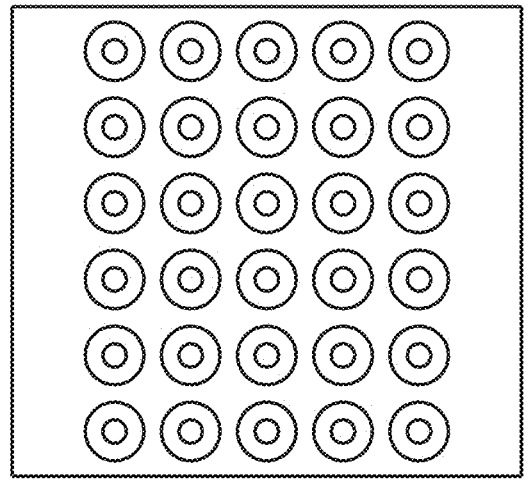
FIG. 5C illustrates a laser treatment that includes a dot pattern of pores, in accordance with various embodiments.

The laser treating of the surface of the metal form to generate a plurality of pores in the surface can include selectively treating predetermined regions of the surface of the metal form with the laser. The predetermined regions of the surface of the metal form include a pattern. The pattern can include any suitable pattern, such as dots, lines, crossed lines, a grid, or a combination thereof. The distance between the dots or lines can be varied such that a desired plastic-metal junction can be formed. FIG. 5A illustrates a laser treatment with a line pattern of grooves. FIG. 5B illustrates a laser treatment with a crossed line pattern of grooves. FIG. 5C illustrates a laser treatment that includes a dot pattern of pores.

The present invention provides a method of forming a junction between a metal form and a solid plastic. The method can include machining a metal form. The method can include laser treating a surface of a metal form to generate a plurality of pores, grooves, or a combination thereof, in the surface of the metal, wherein the machining and laser etching are performed at least partially simultaneously. The method can include contacting the metal surface including the feature with a flowable resin composition. The method can include curing the flowable resin composition to form the solid plastic, to provide the junction between the metal form and the solid plastic. The method can include heating the metal surface prior to or during the contacting. Some or all of the heating prior to the contacting can be provided by the laser treatment of the metal form.

The machining of the metal form and the laser treating of the surface of the metal form are performed at least partially simultaneously, or fully simultaneously. The machining of the metal form and the laser treating of the surface of the metal form, if performed simultaneously, can be performed on different parts of the metal form (e.g., one part of the metal form can be machined, while another optionally already-machined portion of the metal form can be laser treated). The laser treating can be performed on an area of the metal that includes cutting fluid, or an area of the metal that is substantially free of cutting fluid. The laser can include an optical system that includes a lens and mirror that is substantially isolated from cutting dust generated by the machining.

The laser can have any suitable angle of incidence with the surface of the metal. The laser can have an angle of incidence with the surface of the metal of 0 degrees. The laser can have an angle of incidence with the surface of other than 0 degrees.

Figure 6:
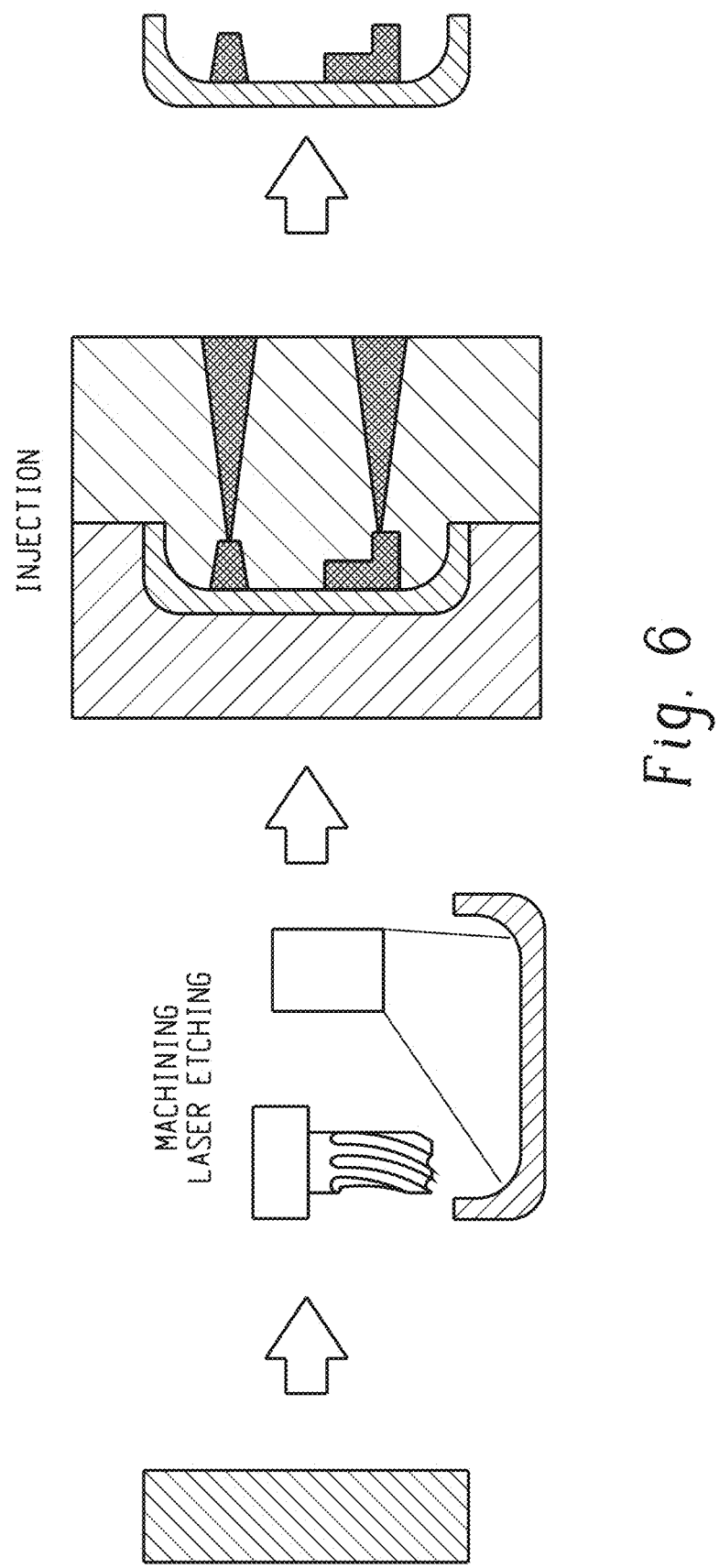
FIG. 6 illustrates a method of insert injection molding including performing at least partially simultaneous machining and laser treating of the metal insert, in accordance with various embodiments.

FIG. 6 illustrates a method of insert injection molding including performing at least partially simultaneous machining and laser treating of the metal insert.

Various embodiments provide a junction between a metal form and a solid plastic. The junction between the metal form and the solid plastic can be any suitable junction formed by any embodiment of a method for forming a junction between a metal form and a solid plastic described herein.

EXAMPLE

Various embodiments of the present invention can be better understood by reference to the following Examples which are offered by way of illustration. The present invention is not limited to the Examples given herein.

Example 1. Formation of Samples

Figure 7A:
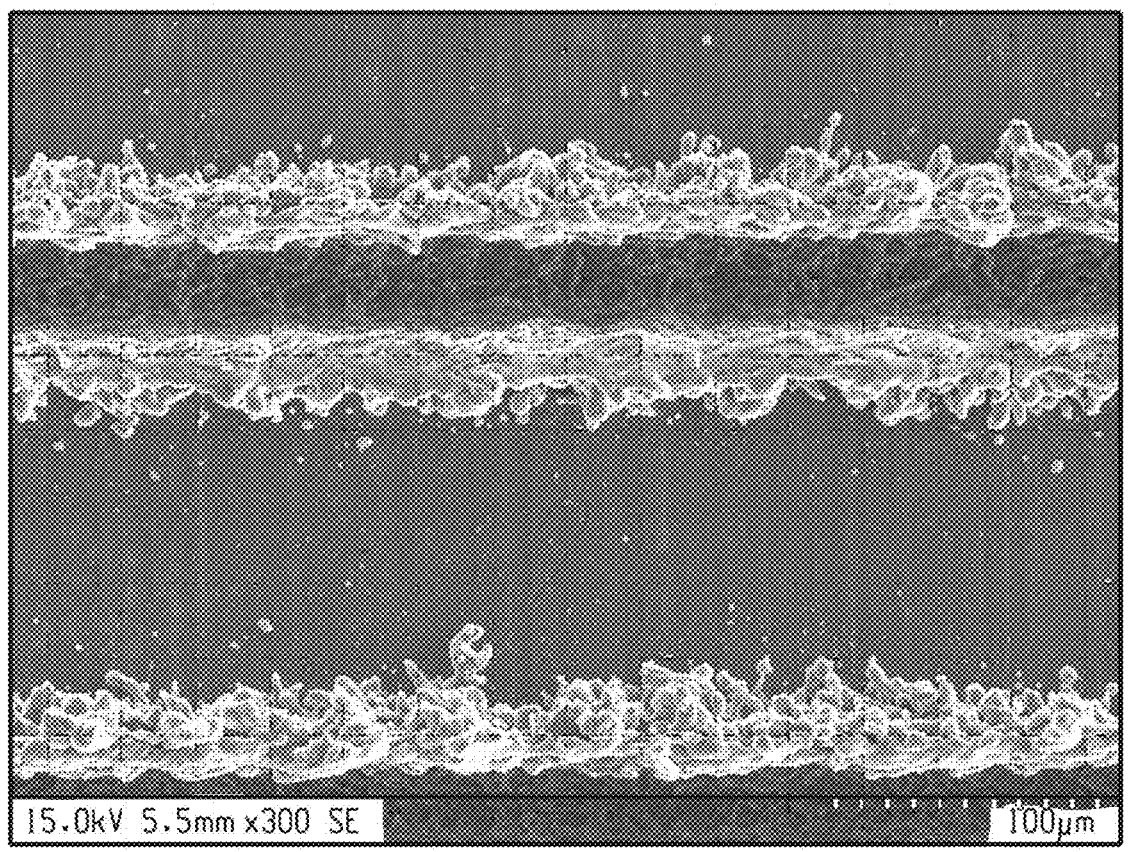
FIG. 7A illustrates a scanning electron microscope (SEM) image of the surface of a metal form after a laser treatment, in accordance with various embodiments.
Figure 7B:
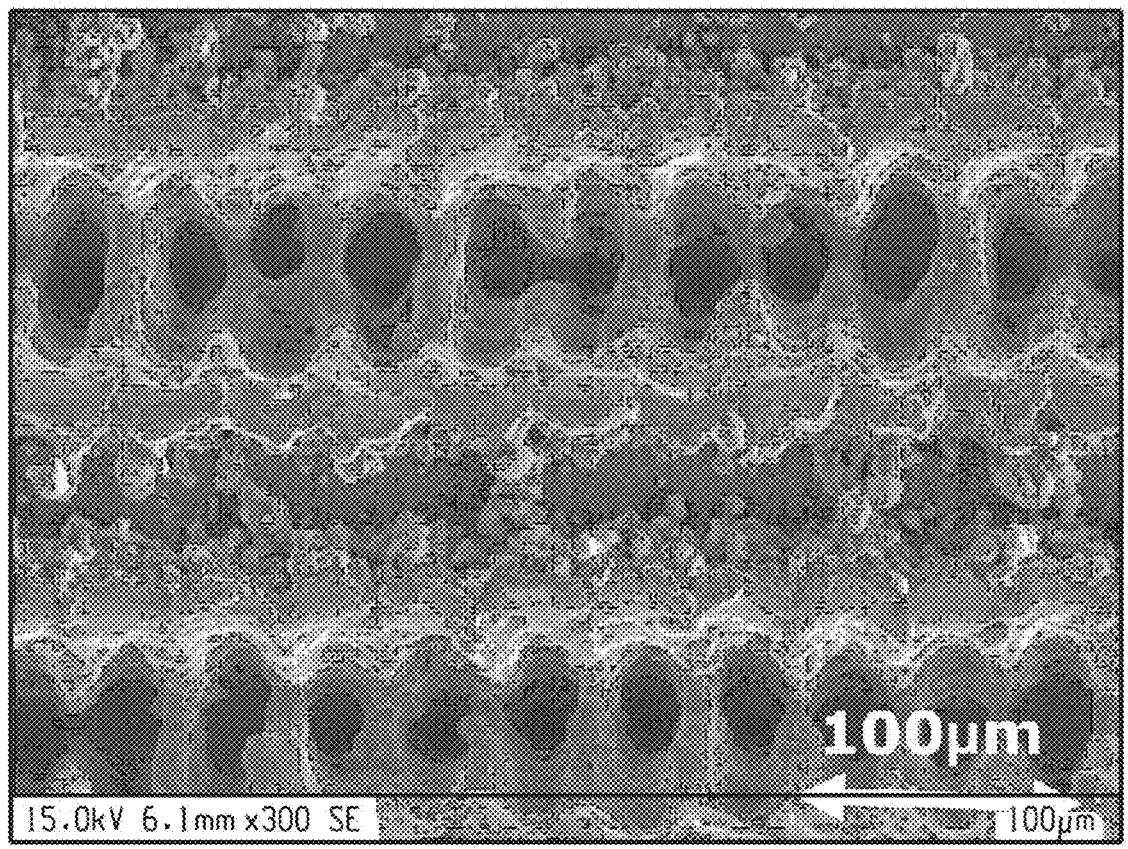
FIG. 7B illustrates a SEM image of the surface of a metal form after a laser treatment, in accordance with various embodiments.

Two samples were prepared using aluminum A5052 was used for testing (size 45 mm×18 mm×1.5 mm). A KEYENCE MD-X1500 laser (wave length 1064 nm, $YVO_4$ Laser, 25 W) was used to prepare Plate 1 with a stripe pattern (e.g., grooves), and Plate 2 with a dot pattern (e.g., pores). A continuous wave laser was used for making stripe pattern. A pulse laser was used for making dot pattern. FIG. 7A illustrates a scanning electron microscope (SEM) image of Plate 1, and FIG. 2B illustrates a SEM image of Plate 2.

Figure 8:
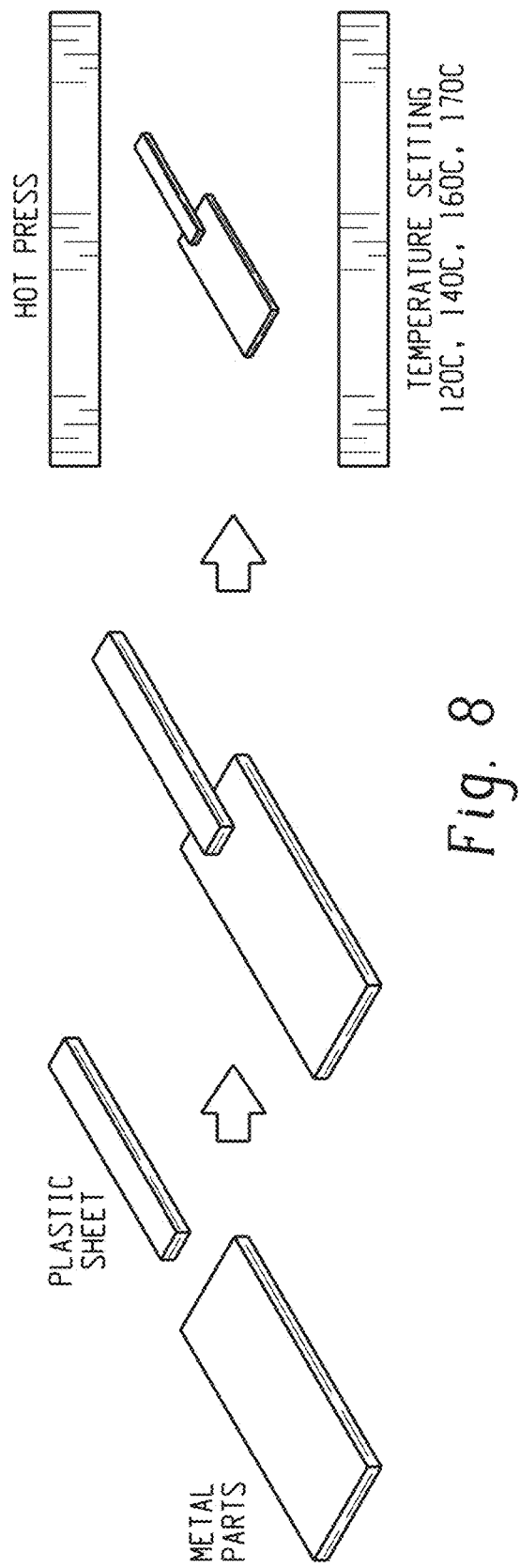
FIG. 8 illustrates a hot press joining method, in accordance with various embodiments.

Etched-metal Plates 1 and 2 and LEXAN™ 8010S (size 50 mm×10 mm×1.5 mm) sheet were overlapped. The overlapped metal and plastic were put into a hot press machine. The overlapped metal and plastic part was pressed at 2.5 tons pressure at 120° C., 140° C., 160° C., 170° C., as illustrated in FIGS. 8 and 9, to form Sample 1 (from Plate 1) and Sample 2 (from Plate 2).

Example 2. Bonding Strength

Figure 9:
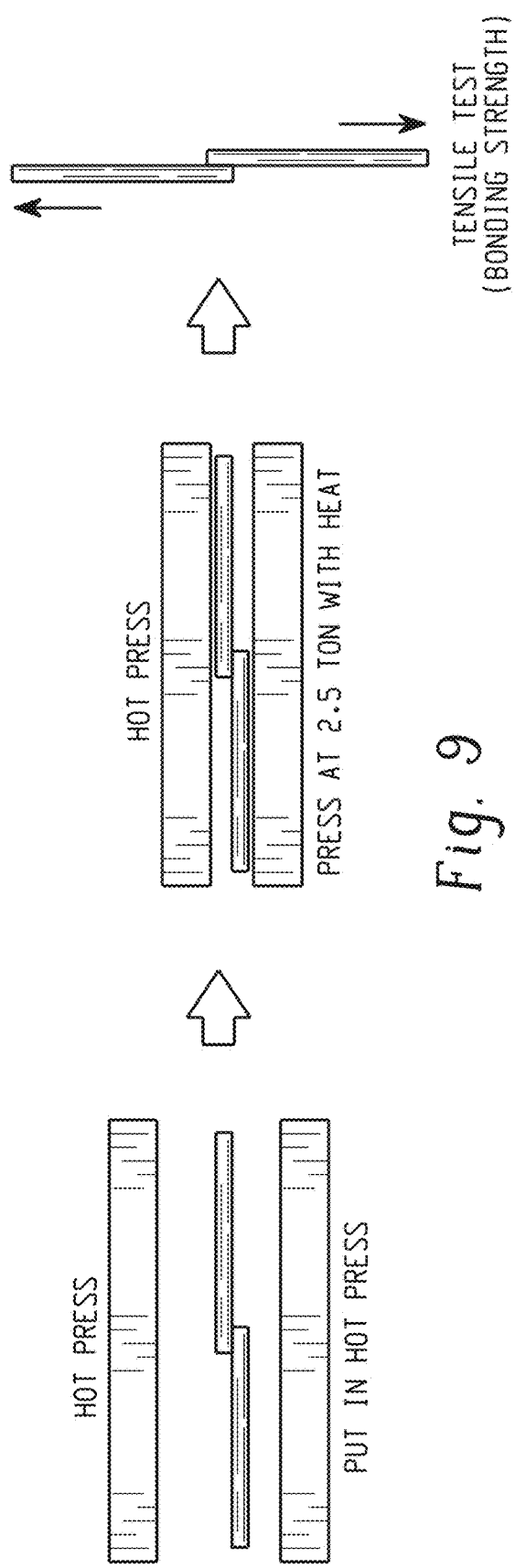
FIG. 9 illustrates a hot press joining method, in accordance with various embodiments.

As illustrated in FIG. 9, the Samples were subjected to a tensile shear bonding strength test, measured by Shimadzu AG-IS, based on ISO19095, with a 10 kN load cell, a tensile speed of 10 mm/min, a temperature of 23° C., at a relative humidity of 50%. The results are illustrated in Table 1.

TABLE 1

Tensile bonding strength of Samples 1 and 2.

| Sample | Metal | Etching pattern | Laser incident angle | Hot press temperature | Bonding strength |
|---|---|---|---|---|---|
| 1 | Aluminum (A5052) | Stripe | 0° | 120° C. | 0 MPa |
| 1 | Aluminum (A5052) | Stripe | 0° | 140° C. | 0 MPa |
| 1 | Aluminum (A5052) | Stripe | 0° | 160° C. | 14 MPa |
| 1 | Aluminum (A5052) | Stripe | 0° | 170° C. | 15 MPa |
| 2 | Aluminum (A5052) | Dot | 0° | 120° C. | 0 MPa |
| 2 | Aluminum (A5052) | Dot | 0° | 140° C. | 0 MPa |
| 2 | Aluminum (A5052) | Dot | 0° | 160° C. | 13 MPa |
| 2 | Aluminum (A5052) | Dot | 0° | 170° C. | 13 MPa |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

The following exemplary embodiments are provided, the numbering of which is not to be construed as designating levels of importance:

Embodiment 1 provides a method of forming a junction between a metal form and a solid plastic, the method comprising:
  laser treating a surface of a metal form to generate a feature in the surface of the metal, wherein the feature comprises plurality of at least one of pores and grooves, (e.g., comprises a plurality of pores, groves, or a combination thereof), and wherein the laser has an angle of incidence with the surface of the metal of other than 0 degrees;
  contacting the metal surface comprising the feature with a flowable resin composition; and
  curing the flowable resin composition to form the solid plastic, to provide the junction between the metal form and the solid plastic.

Embodiment 2 provides the method of Embodiment 1, further comprising machining the metal form.

Embodiment 3 provides the method of Embodiment 2, wherein the machining of the metal form and the laser treating of the surface of the metal form are performed at least partially simultaneously; preferably wherein the machining of the metal form and the laser treating of the surface of the metal form are performed simultaneously.

Embodiment 4 provides the method of any one of Embodiments 1-3, further comprising heating the metal form to a temperature at or above a glass transition temperature of a flowable resin composition.

Embodiment 5 provides the method of any one of Embodiments 1-4, wherein contacting the metal form and the flowable resin comprises penetrating the feature with the flowable resin composition before the curing.

Embodiment 6 provides the method of any one of Embodiments 1-5, wherein the feature is directly in a surface of the metal form, wherein the contacting comprises direct contacting between the metal form and the flowable resin composition.

Embodiment 7 provides the method of any one of Embodiments 1-6, wherein the feature is in a porous adhesion film or coating on the metal form, wherein contacting the metal form and the flowable resin composition comprises contacting the flowable resin composition and the porous adhesion film or coating on the metal form.

Embodiment 8 provides the method of any one of Embodiments 1-7, wherein the contacting of the metal surface comprising the feature with the flowable resin composition comprises injection molding, lamination, extrusion coating, extrusion lamination, thermal lamination, thermal lamination, hot pressing, hot forming, heat conduction joining, or a combination thereof.

Embodiment 9 provides the method of any one of Embodiments 1-8, wherein the contacting of the metal surface comprising the feature with the flowable resin composition comprises lamination.

Embodiment 10 provides the method of any one of Embodiments 1-9, wherein the contacting of the metal surface comprising the feature with the flowable resin composition comprises injection molding.

Embodiment 11 provides the method of any one of Embodiments 1-10, wherein the contacting of the metal surface comprising the feature with the flowable resin composition comprises insert injection molding.

Embodiment 12 provides the method of any one of Embodiments 1-11, wherein the metal form comprises aluminum, steel, stainless steel, copper, magnesium, titanium, an alloy thereof, or a combination thereof.

Embodiment 13 provides the method of any one of Embodiments 1-12, wherein the flowable resin composition comprises an acrylonitrile butadiene, styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an ionomer, an acrylic/PVC alloy, a liquid crystal polymer (LCP), a polyacetal polymer (POM or acetal), a polyacrylate polymer, a polymethylmethacrylate polymer (PMMA), a polyacrylonitrile polymer (PAN or acrylonitrile), a polyamide polymer (PA), a polyamides-imide polymer (PAI), a polyaryletherketone polymer (PAEK), a polybutadiene polymer (PBD), a polybutylene polymer (PB), a polybutylene terephthalate polymer (PBT), a polycaprolactone polymer (PCL), a polychlorotrifluoroethylene polymer (PCTFE), a polytetrafluoroethylene polymer (PTFE), a polyethylene terephthalate polymer (PET), a polycyclohexylene dimethylene terephthalate polymer (PCT), a polycarbonate polymer (PC), a polyhydroxyalkanoate polymer (PHA), a polyketone polymer (PK), a polyester polymer, a polyethylene polymer (PE), a polyetheretherketone polymer (PEEK), a polyetherketoneketone polymer (PEKK), a polyetherketone polymer (PEK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), a polyamideimide polymer (PAI), a polyarylate polymer, a polyoxymethylene polymer (POM), a styrene-acrylonitrile polymer (SAN), or a combination thereof.

Embodiment 14 provides the method of any one of Embodiments 1-13, wherein the flowable resin composition comprises a polymer that is amorphous at standard temperature and pressure, a polymer that is crystalline at standard temperature and pressure, or a combination thereof.

Embodiment 15 provides the method of any one of Embodiments 1-14, wherein the flowable resin composition comprises polycarbonate (PC), acrylonitrile butadiene styrene (ABS), polybutylene terephthalate (PBT), polyethylene terephthalate (PET), polyetherimide (PEI), polyp-phenylene oxide) (PPO), polyamide(PA), polyphenylene sulfide (PPS), polyethylene (PE), polyproplylene (PP), or a combination thereof.

Embodiment 16 provides the method of any one of Embodiments 1-15 wherein the flowable resin composition comprises a filler.

Embodiment 17 provides the method of any one of Embodiments 1-16, wherein the laser treating comprises treating with a laser that comprises a pulsed laser, a continuous laser, a gas laser, a chemical laser, a dye laser, a metal-vapor laser, a solid-state laser, a semiconductor laser, a free electron laser, a gas dynamic laser, a Raman laser, a nuclear pumped laser, or a combination thereof.

Embodiment 18 provides the method of any one of Embodiments 1-17, wherein the laser treating comprises treating with a laser that comprises a pulsed laser.

Embodiment 19 provides the method of any one of Embodiments 1-18, wherein the laser treating comprises treating with a laser that comprises a multiaxis laser.

Embodiment 20 provides the method of any one of Embodiments 1-19, wherein the laser used to perform the laser treating is integrated with a machine used to perform the contacting or the curing.

Embodiment 21 provides the method of any one of Embodiments 1-20, wherein the laser treating comprises treating with more than one laser at least partially simultaneously.

Embodiment 22 provides the method of any one of Embodiments 1-21, wherein the laser has an angle of incidence with the surface of the metal of greater than 0 degrees to less than 90 degrees.

Embodiment 23 provides the method of any one of Embodiments 1-22, wherein the laser has an angle of incidence with the surface of the metal of greater than 0 degrees to about 60 degrees.

Embodiment 24 provides the method of any one of Embodiments 1-23, wherein in addition to the laser treating of the surface of the metal form with an angle of incidence to the metal surface of other than 0 degrees, the method further comprises laser treating of the surface of the metal form with an angle of incidence to the metal surface of about 0 degrees using the same or a different laser.

Embodiment 25 provides the method of any one of Embodiments 1-24, wherein the pores have a diameter, or the grooves have a width, of about 1 nm to about 1 mm.

Embodiment 26 provides the method of any one of Embodiments 1-25, wherein at least part of the sides of the feature has an angle with respect to a line perpendicular to the surface of the metal surface of other than 0 degrees.

Embodiment 27 provides the method of any one of Embodiments 1-26, wherein the laser treating of the surface of the metal form to generate a feature in the surface comprises selectively treating predetermined regions of the surface of the metal form with the laser.

Embodiment 28 provides the method of Embodiment 27, wherein the predetermined regions of the surface of the metal form comprise a pattern.

Embodiment 29 provides the method of Embodiment 28, wherein the pattern comprises dots, lines, crossed lines, a grid, or a combination thereof.

Embodiment 30 provides the method of any one of Embodiments 1-29, wherein the plastic-metal junction has a bonding strength of about 1 MPa to about 100 MPa.

Embodiment 31 provides a junction between a metal form and a solid plastic formed by the method of any one of Embodiments 1-30.

Embodiment 32 provides a method of forming a junction between a metal form and a solid plastic, the method comprising:
 machining a metal form;
 laser treating a surface of a metal form to generate a feature in the surface of the metal, wherein the feature comprises wherein the feature comprises plurality of at least one of pores and grooves, (e.g., comprises a plurality of pores, groves, or a combination thereof), wherein the machining and laser etching are performed at least partially simultaneously;
 contacting the metal surface comprising the feature flowable resin composition; and
 curing the flowable resin composition to form the solid plastic, to provide the junction between the metal form and the solid plastic.

Embodiment 33 provides the method of Embodiment 32, wherein the laser has an angle of incidence with the surface of the metal of other than about 0 degrees.

Embodiment 34 provides the method of any one of Embodiments 32-33, wherein the laser has an angle of incidence with the surface of the metal of about 0 degrees.

Embodiment 35 provides the method of any one of Embodiments 32-34, wherein the machining is performed with a multi-axis machining center.

Embodiment 36 provides the method of any one of Embodiments 32-35, wherein the laser treating is performed on an area of the metal surface that is substantially free of cutting fluid.

Embodiment 37 provides the method of any one of Embodiments 32-36, wherein the laser has an optical system comprises a lens and mirror that is substantially isolated from cutting dust generated by the machining.

Embodiment 38 provides the method of any one of Embodiments 32-37, wherein the laser is integrated with a machine used to perform the machining.

Embodiment 39 provides a junction between a metal form and a solid plastic formed by the method of any one of Embodiments 32-38.

Embodiment 40 provides the method or junction of any one or any combination of Embodiments 1-39 optionally configured such that all elements or options recited are available to use or select from.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation. The term "UW light" as used herein refers to ultraviolet light, which is electromagnetic radiation with a wavelength of about 10 am to about 400 nm.

The term "cure" as used herein refers to exposing to radiation in any form, heating, or allowing to undergo a physical or chemical reaction that results in hardening or an increase in viscosity.

The term "pore" as used herein refers to a depression, slit, or hole of any size or shape in a solid object. A pore can run all the way through an object or partially through the object. A pore can intersect other pores. A pore can be produced by a pulsed laser source.

The term "groove" as used herein refers to a depression, slit, or hole having a greater length than width in a solid object. A groove can intersect other grooves. A groove can be produced by a continuous laser source.

The term room "temperature" as used herein refers to a temperature of about 15° C. to 28° C.

The term "coating" as used herein refers to a continuous or discontinuous layer of material on the coated surface, wherein the layer of material can penetrate the surface and can fill areas such as features (e.g., pores and grooves), wherein the layer of material can have any three-dimensional shape, including a flat or curved plane. In one example, a coating can be formed on one or mare surfaces, any of which may be porous or nonporous, by immersion in a bath of coating material.

The term "surface" as used herein refers to a boundary or side of an object, wherein the boundary or side can have any perimeter shape and can have any three-dimensional shape, including flat, curved, or angular, wherein the boundary or side can be continuous or discontinuous.

As used herein, the term "polymer" refers to a molecule having at east one repeating unit and can include copolymers.

As used herein, the term "injection molding" refers to a process for producing a molded part or form by injecting a composition including one or more polymers that are thermoplastic, thermosetting, or a combination thereof, into a mold cavity, where the composition cools and hardens to the configuration of the cavity. Injection molding can include the use of heating via sources such as steam, induction, or laser treatment to heat the mold prior to injection, and the use of cooling sources such as water to cool the mold after injection, allowing faster mold cycling and higher quality molded parts or forms. An insert for an injection mold can form any suitable surface within the mold, such as a surface that contacts at least part of the injection molded material, such as a portion of an outer wall of the mold, or such as at least part of an inner portion of the mold around which the injection molded material is molded. All insert for an injection mold can be an insert that is designed to be separated from the injection molded material at the conclusion of the injection molding process. An insert for an injection mold can be an insert that is designed to be part of the injection molded product (e.g., a heterogeneous injection molded product that includes the insert bonded to the injection molded material), wherein the injection molded product includes a junction between the injection molded material and the insert.

What is claimed is:

1. A method of forming a junction between a metal form and a solid plastic, the method comprising:
    laser treating a surface of a metal form with a continuous laser to generate a feature in the surface of the metal, wherein the feature comprises a plurality of grooves and wherein the laser has an angle of incidence with the surface of the metal of other than 0 degrees;
    contacting the metal surface comprising the feature with a flowable resin composition; and
    curing the flowable resin composition to form the solid plastic, to provide the junction between the metal form and the solid plastic.

2. The method of claim 1, further comprising machining the metal form, wherein the machining of the metal form and the laser treating of the surface of the metal form are performed at least partially simultaneously.

3. The method of claim 1, further comprising heating the metal form to a temperature at or above a glass transition temperature of a flowable resin composition.

4. The method of claim 1, wherein contacting the metal form and the flowable resin comprises penetrating the feature with the flowable resin composition before the curing.

5. The method of claim 1, wherein the feature is directly in a surface of the metal form, wherein the contacting comprises direct contacting between the metal form and the flowable resin composition.

6. The method of claim 1, wherein the laser treating comprises treating with more than one laser.

7. The method of claim 1, wherein the contacting of the metal surface comprising the feature with the flowable resin composition comprises injection molding, lamination, extrusion coating, extrusion lamination, thermal lamination, thermal lamination, hot pressing, hot forming, heat conduction joining, or a combination thereof.

8. The method of claim 1, wherein the metal form comprises aluminum, steel, stainless steel, copper, magnesium, titanium, an alloy thereof, or a combination thereof.

9. The method of claim 1, wherein the flowable resin composition comprises an acrylonitrile butadiene styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an ionomer, an acrylic/PVC alloy, a liquid crystal polymer (LCP), a polyacetal polymer (POM or acetal), a polyacrylate polymer, a polymethylmethacrylate polymer (PMMA), a polyacrylonitrile polymer (PAN or acrylonitrile), a polyamide polymer (PA), a polyamide-imide polymer (PAI), a polyaryletherketone polymer (PAEK), a polybutadiene polymer (PBD), a polybutylene polymer (PB), a polybutylene terephthalate polymer (PBT), a polycaprolactone polymer (PCL), a polychlorotrifluoroethylene polymer (PCTFE), a polytetrafluoroethylene polymer (PTFE), a polyethylene terephthalate polymer (PET), a polycyclohexylene dimethylene terephthalate polymer (PCT), a polycarbonate polymer (PC), a polyhydroxyalkanoate polymer (PHA), a polyketone polymer (PK), a polyester polymer, a polyethylene polymer (PE), a polyetheretherketone polymer (PEEK), a polyetherketoneketone polymer (PEKK), a polyetherketone polymer (PEK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), a polyamideimide polymer (PAI), a polyarylate polymer, a polyoxymethylene polymer (POM), a styrene-acrylonitrile polymer (SAN), or a combination thereof.

10. The method of claim 1, wherein the flowable resin composition comprises a filler.

11. The method of claim 1, wherein the laser treating comprises treating with a laser that comprises a pulsed laser, a continuous laser, a gas laser, a chemical laser, a dye laser, a metal-vapor laser, a solid-state laser, a semiconductor laser, a free electron laser, a gas dynamic laser, a Raman laser, a nuclear pumped laser, or a combination thereof.

12. The method of claim 1, wherein the laser used to perform the laser treating is integrated with a machine used to perform the contacting or the curing.

13. The method of claim 1, wherein the laser has an angle of incidence with the surface of the metal of greater than 0 degrees to less than 90 degrees.

14. The method of claim 1, wherein the laser has an angle of incidence with the surface of the metal of greater than 0 degrees to 60 degrees.

15. The method of claim 1, wherein at least part of the sides of the feature have an angle with respect to a line perpendicular to the surface of the metal surface of other than 0 degrees.

16. The method of claim 1, wherein the laser treating of the surface of the metal form to generate a feature in the surface comprises selectively treating predetermined regions of the surface of the metal form with the laser.

17. A method of forming a junction between a metal form and a solid plastic, the method comprising:
    machining a metal form;
    laser treating a surface of a metal form to generate a feature in the surface of the metal, wherein the feature is a plurality of pores, grooves, or a combination thereof, and wherein the machining and laser treating are performed at least partially simultaneously;
    contacting the metal surface comprising the feature with a flowable resin composition; and
    curing the flowable resin composition to form the solid plastic, to provide the junction between the metal form and the solid plastic.

18. The method of claim 17, wherein the laser has an angle of incidence with the surface of the metal of other than 0 degrees.

19. The method of claim 17, wherein the laser has an angle of incidence with the surface of the metal of 0 degrees.

20. The method of claim 17, wherein the laser is integrated with a machine used to perform the machining.

* * * * *